(No Model.) 2 Sheets—Sheet 1.
T. J. BROCKWAY & C. TAYLOR.
CORN OR CANE CUTTER OR HARVESTER.
No. 425,402. Patented Apr. 15, 1890.
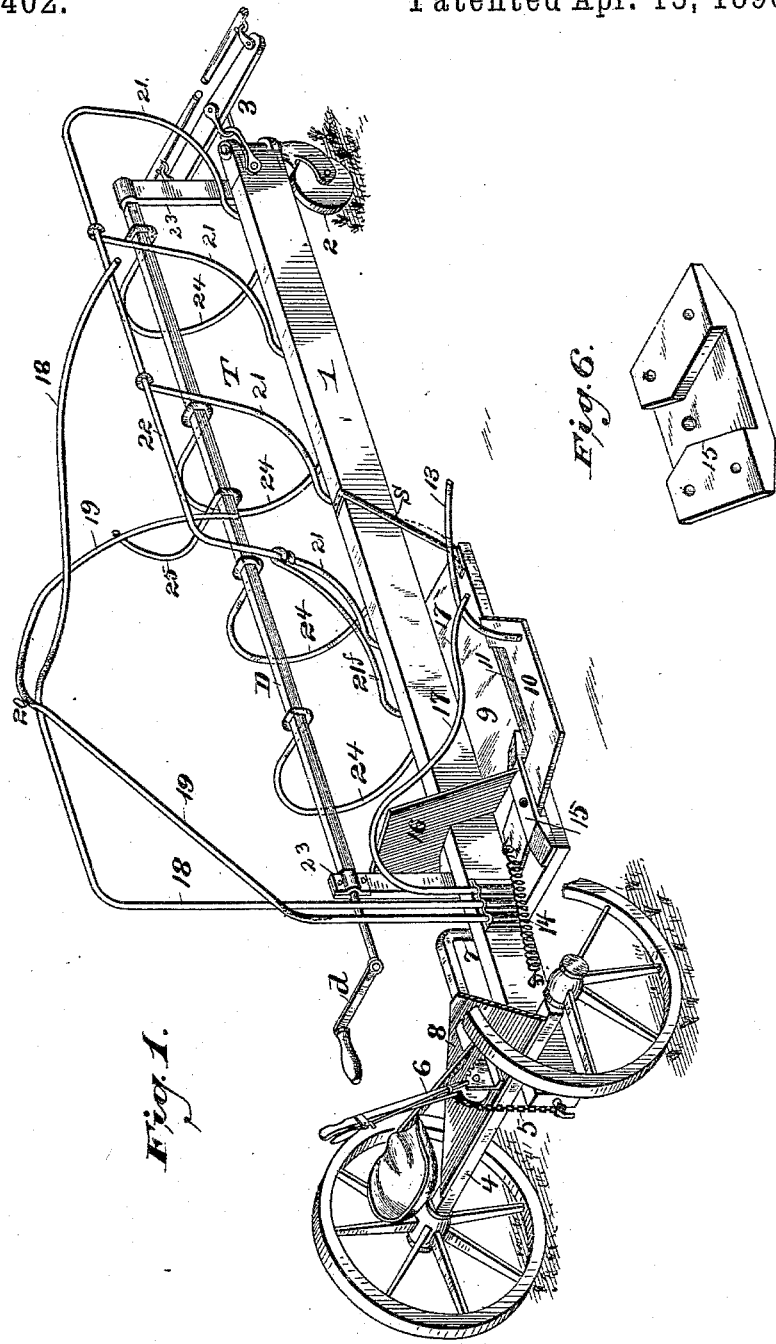
Witnesses
E. T. Walker
Aly Scott
Inventors
Tiffany J. Brockway
Charles Taylor
by F. W. Ritter Jr. atty (No Model.) 2 Sheets—Sheet 2.
T. J. BROCKWAY & C. TAYLOR.
CORN OR CANE CUTTER OR HARVESTER.
No. 425,402. Patented Apr. 15, 1890.
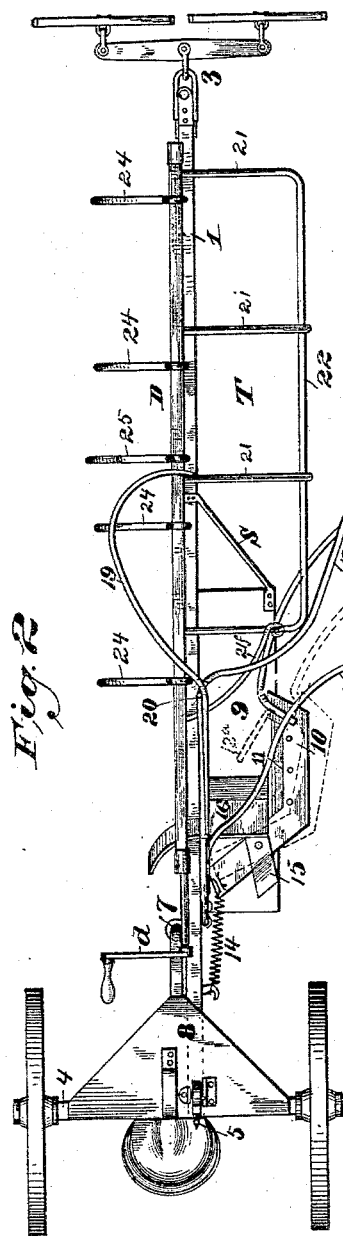
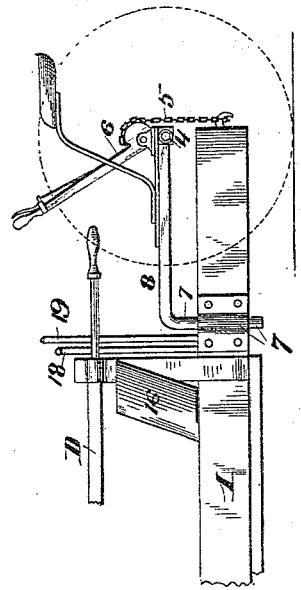
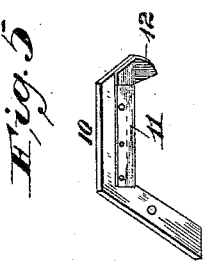
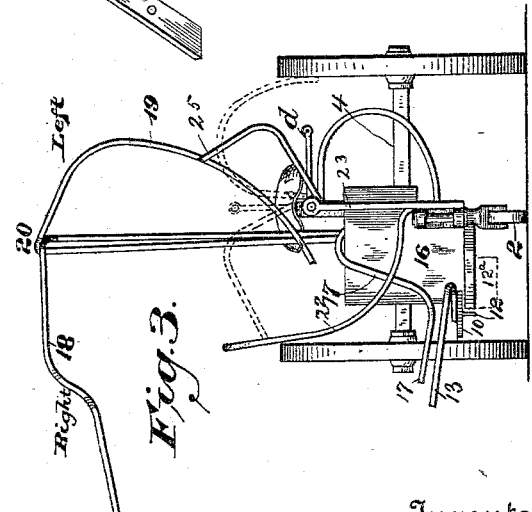

UNITED STATES PATENT OFFICE.

TIFFANY J. BROCKWAY AND CHARLES TAYLOR, OF ARGONIA, KANSAS.

CORN OR CANE CUTTER OR HARVESTER.

SPECIFICATION forming part of Letters Patent No. 425,402, dated April 15, 1890.

Application filed November 5, 1889. Serial No. 329,289. (No model.)

*To all whom it may concern:*

Be it known that we, TIFFANY J. BROCKWAY and CHARLES TAYLOR, both citizens of the United States, residing at Argonia, in the county of Sumner and State of Kansas, have invented certain new and useful Improvements in Corn or Cane Cutters or Harvesters; and we hereby declare the following to be a full, clear, and exact description of the same, reference being had to the accompanying drawings, in which—

Figure 1 is a rear perspective view of a corn or cane cutter embodying our invention. Fig. 2 is a plan view of said machine. Fig. 3 is a front view. Fig. 4 is a detail side view of a portion of the rear of the machine, showing the manner in which the frame is suspended from and connected with the hounds. Fig. 5 is a detached under side view of the jaw and knife. Fig. 6 is an under side view of the cap-piece which controls or limits the play of the knife-jaw.

Like symbols refer to like parts wherever they occur.

Our invention relates to that class of harvesters used for cutting corn or cane and depositing it in gavels; and it consists, first, in the combination, with the stalk-receiving trough, of upper yielding fender-rods secured to the frame, one of said rods extending forward and outward and the other forward and downward into the trough; second, in the combination, with a cutter, of a stalk-receiving trough located forward of the cutter and to one side thereof, a table-fender and backstop for controlling the butt-end of the severed stalk, and yielding upper fenders for controlling the upper part of the stalk and directing it forward into the trough, and also in certain other novel features of construction and combinations of parts, which will hereinafter more fully appear.

We will now proceed to describe our invention more specifically, so that others may apply the same.

In the drawings, 1 indicates the main beam of the frame which carries the operative devices. This beam may be of any suitable form or size, but is preferably about three (3) inches by six (6) inches cross-section and about thirteen (13) feet long. At the front it is supported by a caster-wheel 2 or its equivalent and is provided with a clevis or other suitable means for attaching the doubletree 3 or other draft devices. The rear end of the beam 1 (see Fig. 4) is supported from the axle 4 by a chain 5, controlled by a lever and rack 6, so that said end of the beam can be raised or lowered at will, and a short distance in advance of its point of suspension the beam 1 is vertically journaled, as at 7, to the hounds 8, so that the rear end of the beam can rise and fall or be raised and lowered, and also have a limited pivotal movement or side motion to enable it to follow the row independent of the forward end of the beam, and this without permitting the beam to wabble or move unsteadily. By means of the lever 6 and chain 5 the rear end of beam 1 may be drawn up against the axle and hounds, so as to restrict its movement and cause it to act as a rigid or fixed beam in turning the machine.

Secured to the under side of beam 1, just in advance of its pivotal connection with the hounds, is a platform or table 9, which table may be about three (3) feet long and project laterally about one (1) foot, and may be supported at its front end by an inclined strap or bar S, said strap or bar S serving also the purpose of a fender. In lieu of the strap S the forward end of the table may be rounded or slanted, as indicated in dotted lines, Fig. 1.

Pivoted on the rear of the platform or table 9 is a knife-jaw 10, to the under side of which is secured a knife 11 and a spur 12. (See Fig. 5.) The form of the jaw 10 is preferably such as to allow the knife to assume a position parallel with the edge or side of table 9, and the arrangement of the jaw such as to permit the knife to pass about two (2) inches over or inside the edge of the table at or about one-half ($\frac{1}{2}$) inch above the table. In other words, when the knife is in the position shown in Figs. 1 and 2, its edge will be about two (2) inches inside the table edge, and a space of about one-half ($\frac{1}{2}$) inch will exist between the under side of the blade and the top of table. As the machine is moved forward, the weeds and grass which extend a few inches above the table are pressed forward by and under the table and knife-jaw. To prevent such weeds, as far as possible, from rising between the jaw and table edge when the jaw is opened, I provide the spur 12, hereinbefore referred to, on the under side of the knife-jaw 10, which spur 12 serves to force aside such weeds and grass in the path of the knife-edge and measurably prevent them from getting between the knife and table when the knife-jaw is opened by the incoming stalk, and, if desired, an obliquely-arranged stationary spur or weed-guard 12ª (shown in dotted lines in Figs. 2 and 3) may be placed under table 9 and opposite spur 12, for a like purpose. The space left between the table and knife will permit weeds and grass to pass through without clogging the knife.

Attached to and projecting outward, upward, and forward from the knife-jaw is a jaw-fender 13, which guides or directs the stalk between the knife 11 and the edge of table 9, the upward curvature of the fender 13 being sufficient to allow the fender to pass above or press forward any weeds and grass which extend a few inches above the table. The rear (or heel) of knife-jaw 10 is controlled by a spring 14, which acts to hold the jaw and knife up to the table and force the knife against the entering stalk.

In order to limit the movement or play of the knife-jaw and also to support the jaw, we provide a jaw-cap 15, countersunk to receive the heel-piece of the knife-jaw, said countersunk portion widening out in both directions from the pivot-hole thereof, preferably of the form shown in Fig. 6, or its equivalent, which will allow about one foot play of said knife-jaw 10.

16 indicates a back-stop, which may be of sheet-iron or other suitable material, secured to the table 9 or beam 1 (as the case may be) in an inclined position, and just in advance of the pivot-point of the knife-jaw, which back-stop serves to arrest the butt of the stalk and direct it upward. Secured to the main beam 1, just back of said back-stop 16, are three fenders 17, 18, and 19, which are formed of yielding metal rods, preferably steel rods, free at their forward ends. The first of these fenders 17 we term the "table-fender," as it curves over the back-stop 16, down in front thereof, over the table, and outward over the knife-jaw 10, and serves, when the knife-jaw has been forced open by the entering stalk, (see dotted lines, Fig. 2) as a continuation of jaw-fender 13 to control the butt of the severed stalk on the table. The remaining two 18 and 19 we, for purposes of this description, term the "right and left hand upper fenders," as they are intended to control the upper part of the stalk and direct it forward into the receiving-trough. The fender 18, to the right hand of the driver, we will term the "right-hand upper fender," and fender 19, to the left hand of the driver, we will term the "left-hand upper fender." Both of these upper fenders 18 and 19 may rise to a height of about four (4) feet above the table, where they are preferably made to cross each other or fork as shown in Figs. 1 and 2, the fenders 18 then curving outward and forward to the right over the table and the left-hand upper fender 19 curving to the left forward and downward substantially in the vertical plane of beam 1, the point 20 of crossing of the two fenders 18 and 19 being in advance of the back-stop 16, so that the upper part of the cut stalk shall be guided forward and downward at the same time that the base of the stalk is directed inward by table-fender 17 and upward by back-stop 16.

Secured to the main beam 1 (or frame) in advance of the cutting-knife and extending back to the table 9 is a receiving-trough T for the cut stalks. This trough will occupy the forward portion of beam 1 on the same side as the table, but in a higher plane, (or elevated above the table,) and may be an open rack of rods 21 21, attached to the beam about two (2) feet apart, bent or curved about four (4) inches above the beam, extending up to about three (3) feet above the table and joined at their tops, as at 22. The first rod of the rack or trough (marked $21^f$) is preferably bent forward and upward (see Fig. 1) and joined to the second rod, so as to form an inclined fender to coact with the back-stop 16 and with the upper fender 19 in directing the butt of the stalk upward. The receiving-trough T may project to the right of beam 1 to any extent which will not interfere with the stalks entering the cutting-knife.

Rising vertically above frame-beam 1 and attached thereto near its opposite ends are two posts 23 23, on which is journaled a shaft or beam D, provided at its rear end, if desired, with a crank arm or handle $d$, whereby the beam D may be rotated or partially rotated on its axis. Attached to said beam D are curved rods 24 24, whose free ends rest against the beam 1 and form the bottom and one side of trough T when the devices are in position shown in full lines in the several figures of the drawings, and also attached to the beam D just in advance of the lower end of left-hand upper fender 19 is a reversely-curved single rod or arm 25.

The curved rods 24 24 form a dumping-bottom for the receiving-trough, which can be rotated to the left (see dotted lines, Fig. 3) to deposit the gavel, by which rotation the reversely-curved arm 25 is brought to the right over the beam and in juxtaposition to fender 19 to arrest and prevent the fall of further stalks until the gavel has been deposited and the dumping bottom returned to its first position by the reverse rotation of shaft D. The reverse rotation of shaft D also withdraws the detaining-arm 25, and allows the arrested stalks to fall into the receiving-trough.

The object and operation of the several parts or elements of the machine have been described fully in connection with the description of the elements.

Considered as a whole, the machine will operate as follows: As the machine advances along the row of corn or cane to the left thereof, the corn or cane stalk will pass close to and on the right side of the receiving-trough T. The upper part of the stalk, striking upper right-hand fender 18, will be guided toward beam 1 over the receiving-trough, while the base of the stalk, striking jaw-fender 13, will be guided between knife 11 and the edge of the table 9, the jaw opening to allow the entrance of the stalk, but becoming fixed at its point of limited motion. The stalk is thus severed by a shear or drawing cut, and the butt of the stalk resting on the table 9 is guided toward beam 1 by the table-fender 17 until it strikes the inclined back-stop 16. At this time the top of the stalk, which has reached the crossing-point 20 of the two upper fenders 18 19, is being carried forward, and the butt of the stalk will ride up the back-stop 16, the top of the stalk descending by its own gravity along the left-hand upper fender 19, so as to be deposited in the trough T in advance of the table and with its butt to the rear. When sufficient stalks have been received in the trough to form a gavel of the desired size, the tilting bottom is operated and the gavel deposited on the ground, as hereinbefore specified.

It will be noted that the construction and operation of the dumping-section are such that it does not interfere with the driving-reins; that the connection of the frame-beam 1 and the hounds is such that the beam can be raised or lowered at will, and that no wabbling or irregular motion of the beam can take place; further, that the rear part of beam 1 has sufficient side motion to enable it to follow the row independently of the forward end of the beam, and, finally, that the stalks are cut by a drawing or shear cut, which requires less power, and are delivered in advance of and in full control of the operator.

In the description of our invention we have mentioned such proportions and arrangements of the several elements as we have found desirable and effective; but the same is not to be taken as matter of limitation, as they may be varied at the will of the constructor or to meet the necessities of any special case.

Having thus fully described our invention, with its operation and advantages, what we claim, and desire to secure by Letters Patent, is—

1. In a corn and cane harvester, the combination, with a stalk-receiving trough, of an upper fender composed of yielding or elastic rods, one of which extends forward and outward and the other forward and downward into the trough, said rods being free at their forward ends and secured at their rear ends to the frame, substantially as and for the purposes described.

2. In a corn and cane harvester, the combination, with a cutter, of a stalk-receiving trough located forward of the cutter and to one side thereof, a table-fender adapted to guide the butt of the severed stalk to the rear of and in line with the trough, and yielding upper fenders mounted on the table back of the cutter, one of said fenders projecting forward and outward and the other forward and downward, and adapted to direct the stalk forward into the receiving-trough, substantially as and for the purposes described.

3. In a corn and cane harvester, the combination, with a suitable table, of a cutter-jaw pivoted on the table and provided with a knife and jaw-fender, said jaw-fender projecting forward and outward to gather the stalks and open the knife, and a spring for holding the knife-jaw up to the table, substantially as and for the purposes specified.

4. In a corn and cane harvester, the combination, with a suitable table, of a knife-jaw having a heel-piece pivoted on the table, said jaw adapted to be opened by the incoming stalk, a straight-edged knife arranged parallel with the table and with the draft-beam and adapted to coact with the edge of the table, and a spring acting on the heel of the knife-jaw, substantially as and for the purposes described.

5. In a corn and cane harvester, the combination, with a suitable table, of a stalk-receiving trough located in front of the table, a stalk cutter or knife, and a rearwardly-inclined back-stop arranged on the table to arrest the severed stalk, substantially as and for the purposes described.

6. In a corn and cane harvester, the combination, with a suitable table, of a cutter or knife for severing the stalk, a back-stop arranged on the table behind and at one side of the knife to arrest the stalk when severed, and a table-fender arranged above the back-stop and extending downwardly and outwardly to guide the butt of the stalk to the back-stop, substantially as and for the purposes described.

7. In a corn and cane harvester, the combination, with a suitable table, of a pivoted cutter or knife arranged parallel with the table and with the draft-beam for severing the stalk, a back-stop on the table for arresting the severed stalk, and upper fenders, one of which projects forward and downward for forcing the severed stock forward, substantially as and for the purposes specified.

8. In a corn and cane harvester, the combination, with a suitable table, of a cutter or knife for severing the stalk, a back-stop for arresting the severed stalk, said back-stop arranged on the table behind and at one side of the knife, a table-fender arranged above the back-stop and extending downwardly and forwardly to direct the butt of the stalk from the knife to the back-stop, and upper fenders for forcing the top of the stalk forward, one of said fenders extending forwardly and downwardly, substantially as and for the purposes specified.

9. In a corn and cane harvester, the combination, with a suitable table, of a cutter or knife for severing the stalk, said knife pivoted on the table, a gavel or stalk receiving trough located forward of the table, a back-stop arranged on the table in advance of the pivot-point of the knife to arrest the severed stalk when delivered on the table, and yielding-rod upper fenders to force the stalk forward into the trough, substantially as and for the purposes described.

10. In a corn and cane harvester, the combination, with a suitable table, of a cutter or knife for severing the stalk, a rearwardly-inclined back-stop for arresting the severed stalk, a table-fender for guiding the butt of the severed stalk to the back-stop, yielding upper fenders for forcing forward the top of the stalk, and a trough for receiving the stalk, said trough provided at its rear end with a trough-fender for directing the butt of the stalk, substantially as and for the purposes specified.

11. In a corn and cane harvester, a stalk-trough arranged in front of the cutters and having a fixed side supported by the draft-beam and a movable side journaled in supports on the fixed draft-beam, the latter forming the gavel-dumper, substantially as and for the purposes described.

12. In a corn and cane harvester, a trough arranged in front of the cutters, said trough having a fixed side supported by the draft-beam and a movable side attached to a beam journaled in supports on the fixed draft-beam, said journal-beam provided with an upwardly-extending detaining-arm curved in a reverse direction to the movable bottom section of the trough, substantially as and for the purposes specified.

13. In a corn and cane harvester, the combination, with a stalk-table, of a knife-jaw having a heel-piece at an angle to the jaw, said heel-piece pivoted on the table, and a countersunk cap adapted to inclose the heel-piece, said countersunk portion widening out in both directions from the pivot-hole thereof, substantially as and for the purposes described.

14. In a corn and cane harvester, a pivoted or movable cutter provided with a spur on its under side adapted to force the weeds and grass to one side as the jaw is opened to prevent their entering the cutter, substantially as and for the purposes described.

15. In a corn and cane harvester, the combination of a main beam and rear axle, the end of the beam being adjustably supported from the axle by a flexible connection, and the beam vertically journaled in the hounds in advance of its rear end, substantially as and for the purposes specified.

16. In a corn and cane harvester, the combination of beam 1, axle 4, and hounds 8, the beam being journaled to the hounds by a vertical pivot 7 and adjustably supported from the axle by a flexible connection, as at 5 6, substantially as and for the purposes specified.

17. In a corn and cane harvester, the combination, with a stalk-cutter, of a stalk-trough supported on the draft-beam and arranged in front of the cutter, and two upper fenders secured to the frame back of the stalk-cutter, one of said fenders projecting upward, outward, and forward in advance of the cutter and above the trough, and the other of said fenders projecting first upward, then forward and downward into the stalk-trough, substantially as and for the purposes described.

In testimony whereof we affix our signatures, in presence of two witnesses, this 29th day of October, 1889.

TIFFANY J. BROCKWAY.
CHARLES TAYLOR.

Witnesses:
C. M. PIERCE,
J. J. PIERCE.